Figure 1:
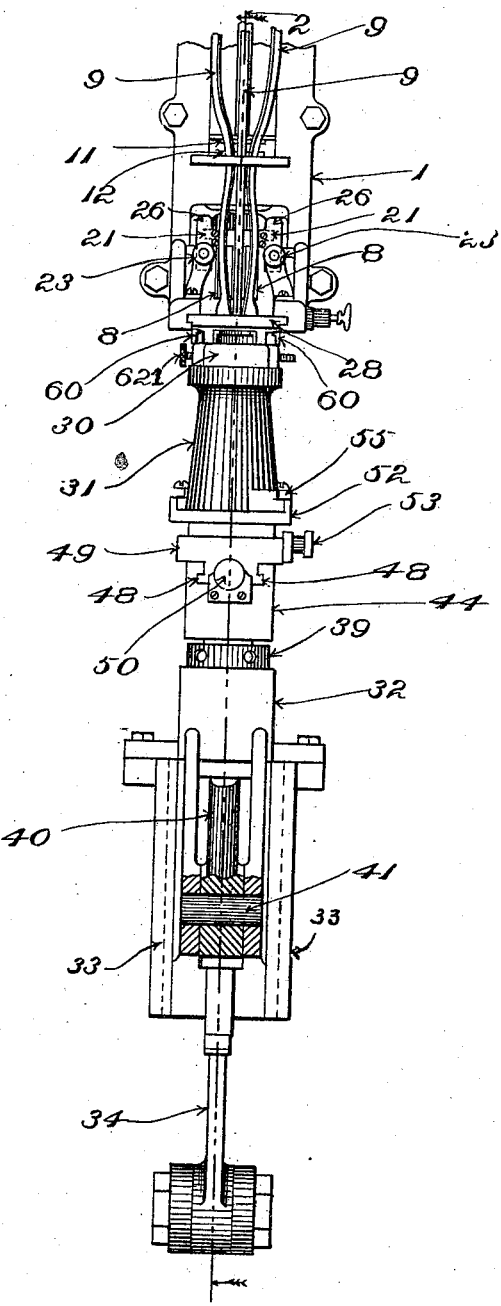

H. W. WINTER.
MACHINE FOR SETTING HEEL AND SOLE PROTECTORS FOR BOOTS AND SHOES.
APPLICATION FILED JULY 21, 1899.

983,665.

Patented Feb. 7, 1911.

5 SHEETS—SHEET 1.

Witnesses:
Oscar F. Hill

Inventor
Henry W. Winter
By MacLeod Calvert Randall
Attorneys.

H. W. WINTER.
MACHINE FOR SETTING HEEL AND SOLE PROTECTORS FOR BOOTS AND SHOES.
APPLICATION FILED JULY 21, 1899.
983,665.
Patented Feb. 7, 1911.
5 SHEETS—SHEET 2.
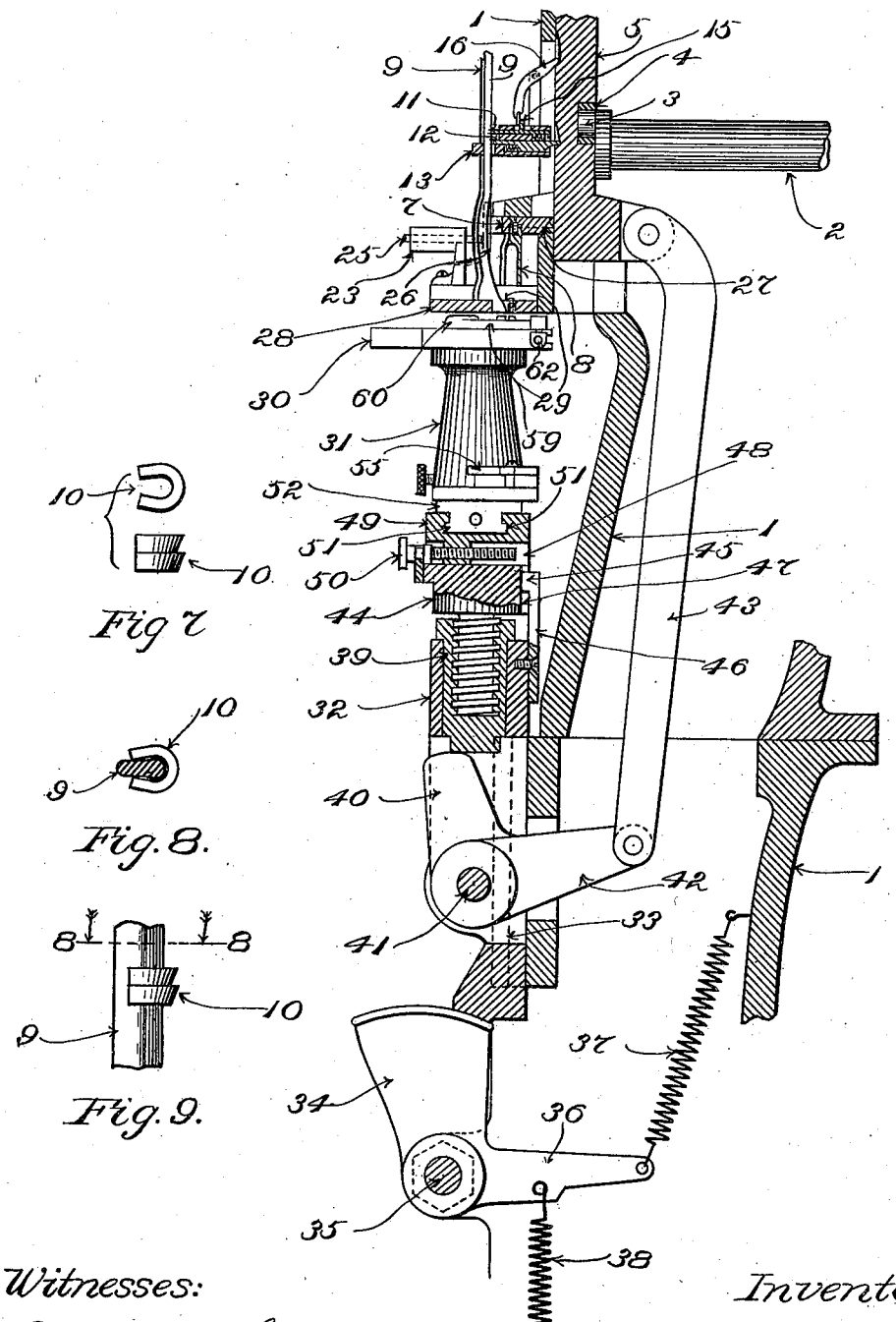

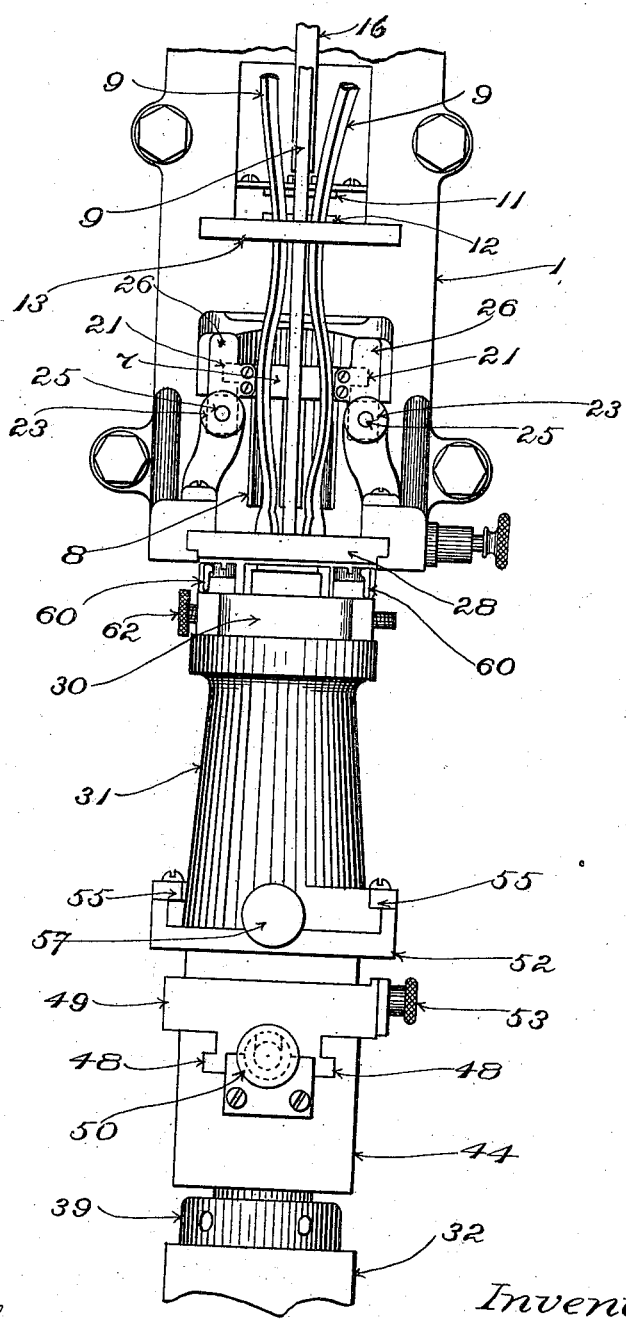

H. W. WINTER.
MACHINE FOR SETTING HEEL AND SOLE PROTECTORS FOR BOOTS AND SHOES.
APPLICATION FILED JULY 21, 1899.
983,665.
Patented Feb. 7, 1911.
5 SHEETS—SHEET 4.
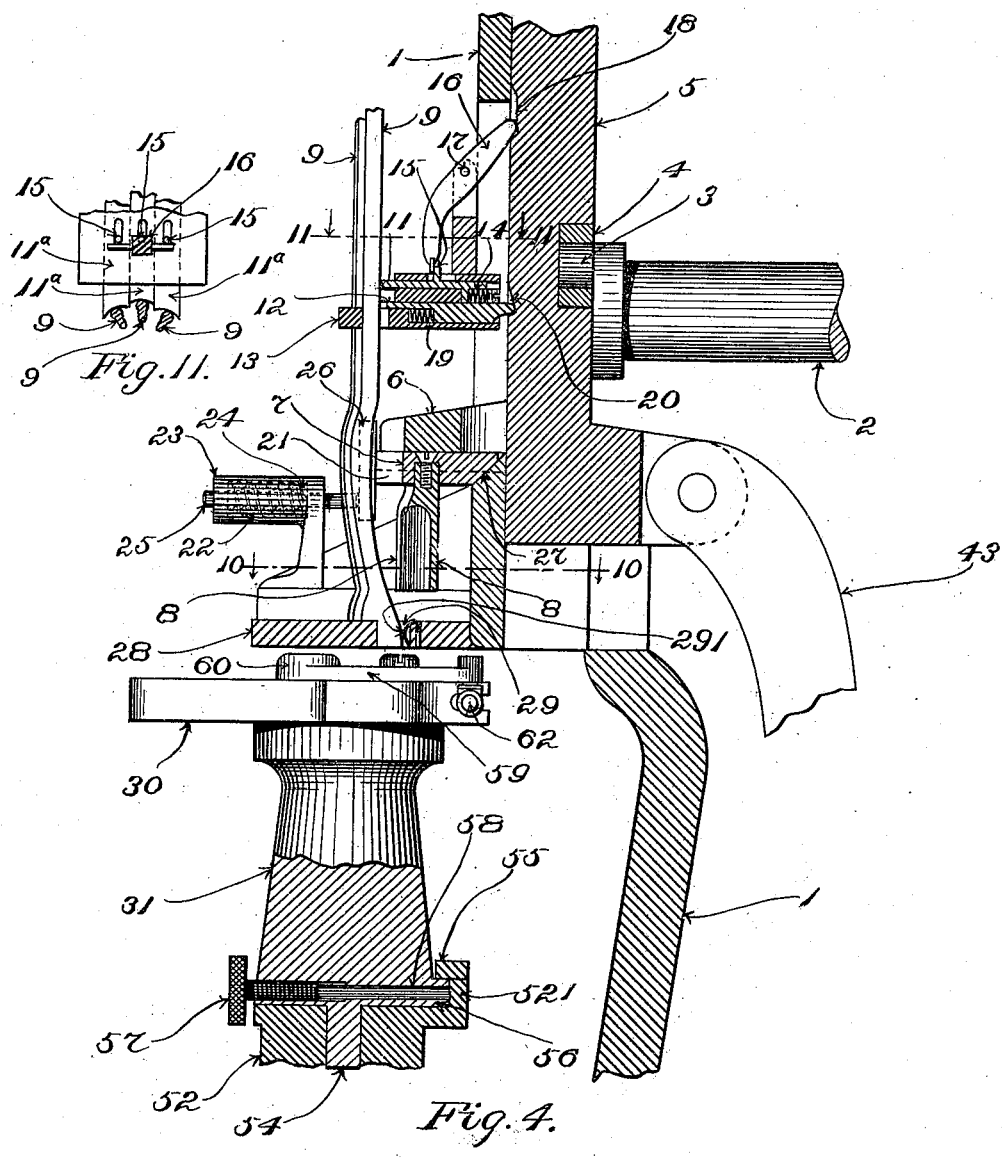
Witnesses:
Oscar F. Hill
Inventor:
Henry W. Winter
By Macleod Calver & Randall
Attorneys.

H. W. WINTER.
MACHINE FOR SETTING HEEL AND SOLE PROTECTORS FOR BOOTS AND SHOES.
APPLICATION FILED JULY 21, 1899.
983,665.
Patented Feb. 7, 1911.
5 SHEETS—SHEET 5.
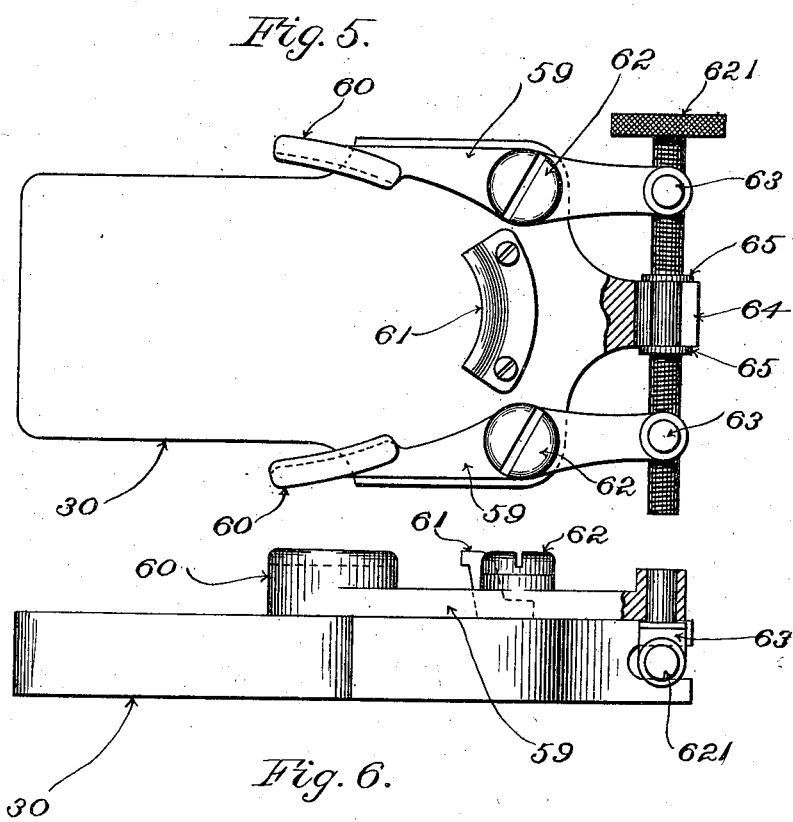

UNITED STATES PATENT OFFICE.

HENRY W. WINTER, OF LAWRENCE, MASSACHUSETTS, ASSIGNOR TO UNITED SHOE MACHINERY COMPANY, OF PATERSON, NEW JERSEY, AND BOSTON, MASSACHUSETTS, A CORPORATION OF NEW JERSEY.

MACHINE FOR SETTING HEEL AND SOLE PROTECTORS FOR BOOTS AND SHOES.

983,665.

Specification of Letters Patent. Patented Feb. 7, 1911.

Application filed July 21, 1899. Serial No. 724,585.

*To all whom it may concern:*

Be it known that I, HENRY W. WINTER, a citizen of the United States, residing at Lawrence, in the county of Essex and State of Massachusetts, have invented certain new and useful Improvements in Machines for Setting Heel and Sole Protectors for Boots and Shoes, of which the following is a specification, reference being had therein to the accompanying drawings.

Protectors or reinforces for reducing or retarding the wear of heels and soles of boots and shoes are at the present time employed in practice. These protectors usually are made of metal, and certain forms of the same are applied by being driven into the parts to be protected.

The invention has relation to mechanism by means of which the driving of protectors and the like into heels and soles of boots and shoes may be effected automatically.

More especially, it refers to devices by means of which protectors are delivered and driven into the work at the places desired, and to devices by means of which the work is positioned and clamped in place for the purpose of enabling the driving to be effected.

One form of protector which has gone into extensive use is substantially of horseshoe shape in horizontal cross-section, and in practice is driven into the work until the exposed or wearing end of the protector is substantially flush with the adjacent portions of the wearing surface of the part to which the protector is applied.

The invention has been designed, more especially, with reference to applying protectors of this form, although it will become apparent from the following description, and the illustration in the accompanying drawings, that certain of the features of the invention are adapted for use equally well in making application of other forms of protectors.

In the practical embodiment of the invention, I employ a series of raceways arranged side by side in a machine. These raceways are each shaped and constructed to receive a line of the protectors and guide them on their way to the place where they are driven into the work. For use in connection with the horse-shoe shaped protectors to which reference has been made, and which are termed "circlettes" in the trade, the raceways are constituted of strips. The protectors are applied to and caused to fit over the edges of the said strips, being allowed to slide endwise along the strips in properly regulated manner, suitable provision being made for preventing the escape of the protectors from the edges of the raceways before they arrive at the predetermined place of discharge. One mode of providing against premature escape of the protectors from the raceways consists in forming that edge of each raceway to which the protectors are applied somewhat enlarged, or beaded, so as to fill the interior openings of the protectors, the mouths of the said openings being somewhat contracted so that the extremities of the side-portions of the protectors clasp the said enlarged or beaded portions of the raceways. The raceways are fixed in their position in the machine.

The protectors are applied to the upper portions of the raceways in suitable manner, preferably by automatic devices on the order of those which are presented in my applications for U. S. Letters Patent, Serial No. 695,540 filed November 5, 1898, and Serial No. 717,674 filed May 22, 1899.

The raceways extend downward in the machine, so that the protectors slide down along by gravity, as usual in machines for the like purposes, and their lower ends terminate at the places where the protectors are to be driven into the work. With the said lower ends are combined detent and let-off devices by means of which the delivery of the protectors to the drivers is controlled, and adjacent to the said lower ends of the raceways are arranged drivers which are operated to drive the protectors directly from their positions at the said lower ends of the raceways into the work. A driver-block or plate at the said lower ends constitutes a rest against the under side of which the work is compressed by means of a movable work-support, the protectors being driven by the drivers through holes in the said driver-block or plate into the work while the latter is held thus compressed.

The work-support is mounted upon a slide which is moved at the will of the operator to carry the work-support toward and from the driver-block. The said slide is actuated by means of a movable cam which, in practice, is operatively connected with the treadle by means of which the operator controls the driving clutch of the machine, whereby, when the said treadle is pressed down to operate the clutch for the purpose of occasioning a revolution of the driving shaft of the machine, the preliminary portion of the movement of the treadle operates to move the cam and thereby actuate the slide, to carry the work-support with the work thereon toward the driver-block, so as to press the work against the said driver-block.

The work-support is movable upon the slide, independently of the latter, toward and from the driver-block, and is in operative connection with a second cam, the latter being in operative connection with the plunger that operates the drivers. Thereby, after the work has been pressed against the driver-block in consequence of the movement of the slide occasioned by the means first described, the work-support is given its independent movement upon the slide, for the purpose of compressing the work more firmly still against the driver-block during the driving of the protectors.

The work-support is mounted with capacity for adjustment toward and from the driver-block to suit the thickness of the sole or heel into which the protectors are to be driven, and also in two directions transversely with relation to the latter and the drivers, in order to enable the protectors to be driven exactly where required, while it is also capable of being swung from one position to another transversely, in order to enable the protectors to be driven properly into a right-hand or left hand heel, or the like.

The accompanying drawings illustrate the best form in which I have thus far embodied the invention.

In the said drawings: Figure 1 shows in front elevation portion of a protector-setting machine, illustrating the said embodiment of the invention. Fig. 2 is a view thereof mainly in vertical section on approximately the plane that is indicated by the dotted line 2—2 in Fig. 1, looking in the direction that is indicated by the arrows near the ends of the said line. Fig. 3 is a view in front elevation showing on a larger scale the upper portion of the mechanism that is represented in Fig. 1. Fig. 4 is a view in vertical section, like Fig. 2, showing on an enlarged scale the upper portion of the said mechanism. Fig. 5 is a plan showing a work-support especially fitted for use in connection with spring-heel soles. Fig. 6 is a side elevation of the said work-support. Fig. 7 shows one of the "circlette" protectors which the illustrated form of mechanism is more especially fitted to drive. Fig. 8 is a view in horizontal section in the plane indicated by the dotted line 8, 8, in Fig. 9, looking in the direction indicated by the arrows near the ends of such line, and showing one of the raceways with a protector fitting thereon. Fig. 9 shows in side elevation a portion of a raceway, with a protector fitting thereon. Fig. 10 is a section on line 10, 10, Fig. 4. Fig. 11 is a section on line 11, 11, Fig. 4.

For the sake of securing simplicity and clearness, the present drawings have been made to show only such portions of a machine for setting protectors as are involved in the invention, or are most immediately related thereto.

1 designates certain portions of the fixed framework or castings of the machine.

2 is a portion of the main or driving shaft of the machine, only the forward end thereof being shown. In practice, a driving wheel or pulley is provided in the machine, and also clutch devices operable at the will of the attendant of the machine, and by means of which the said wheel or pulley may be operatively connected with the said shaft, when required. The said main or driving shaft normally stands at rest, but is thrown into action by the said attendant through the agency of the said clutch devices and suitable controlling connections therefor, the shaft being caused to complete one revolution and then to come to rest, all as usual in a variety of machines of different kinds at present in use. Any suitable or known means of providing for operating the said shaft in the manner just indicated may be utilized in practice, as, for instance, the means of my application aforesaid.

3 is a wrist-pin at the said forward end of the said shaft, 4 the roll which is fitted upon the said wrist-pin, the said roll working in a slot in the back of the plunger which carries the drivers, and 5 the said plunger. Through the connections just referred to the plunger is actuated when the shaft 2 is rotated. Normally, the plunger stands at rest in the elevated position in which it is shown in the drawings.

6, see more particularly Fig. 4, designates a forwardly projecting piece on the plunger, to which piece is applied the carrier 7 for the drivers 8, 8.

9, 9, are the raceways, three in number in the present instance, by means of which the protectors are guided to the proper places for being driven, and are there presented in position for being acted upon by the said drivers 8, 8, when the latter are caused to approach the work. A protector is shown separately in Fig. 7 at 10, and in Figs. 8 and 9 one is represented in connection with portion of one of the raceways 9. The upper portions of the raceways 9, 9, together with the devices employed in connection therewith for loading protectors upon the same, etc., are omitted, but may be in practice as in my applications aforesaid.

The devices which are employed in connection with the lower portions of the raceways for detaining the protectors in their descent to the drivers, and permitting one protector on each raceway at a time to pass down to the drivers, comprise the detent 11, and let-off 12, and means by which the said detent and let-off are moved in alternating order. The parts 11 and 12 are in the form of slides, and are arranged one above the other in a suitable support 13 a short distance above the drivers 8, 8. The raceways 9, 9, pass through holes in a forwardly projecting portion of the said support, the said holes being proportioned to allow the free passage of the protectors therethrough along the raceways. The forward edges of the detent 11 and let-off 12 are intended to engage alternately with the protectors on the raceway. A spring 14 acts to hold the engaging edge of the detent 11 projected into proximity to the raceways, so as to cause it to arrest the first of the descending protectors, and hold it and the succeeding ones back until the said detent is drawn back.

For the purpose of effecting automatically the retraction of the detent 11 at the proper time in the working of the machine, the detent is provided with an upwardly projecting pin 15, and a lever 16 is pivoted at 17 on a fixed portion of the head of the machine, the said lever having a flattened lower end for engagement with the said pin 15. See Figs. 2 and 4. The upper end of the lever 16, through the action of spring 14, is caused to bear against the forward face of the plunger 5, and in the said face is formed a depression 18, into which latter the said end of the lever enters when the plunger occupies its normal or elevated position shown in the drawings. This is the position that is occupied thereby while the machine stands at rest. When the main or driving shaft 2 is set in motion by the attendant through the clutching devices, etc., to which reference has been made hereinbefore, the descent of the plunger carries the depression 18 downward and away from the upper end of lever 16, the inclined bottom of the said depression and the face of the plunger acting to move lever 16 and cause it to press the detent away from the raceways 9, 9. When this occurs, the protectors that have been arrested on the said raceways by the previous action of the detent are freed, and immediately descend by gravity until arrested by the let-off 12. In the subsequent rise of the plunger, the depression 18 is presented again to the upper end of lever 16, and thereupon spring 14 is permitted to act to project the detent 11 forwardly, it passing in between the bottom protector and the one next above the same on each raceway. The rear end of the let-off slide 12 makes contact with the front face of the plunger 5, and by the latter the front end of the let-off is held forward in position to catch and support the bottom protectors on the raceways 9, 9, as they drop past the detent, on the withdrawal of the latter.

The release of the bottom protector on each raceway in season to enable the same to descend to the driving points in time to be driven into the work by a descent of the plunger and drivers, is effected by means of a spring 19 acting against the let-off slide with a tendency to retract the same from its position near the raceways, and a depression 20 in the plunger. The face of the plunger acts to hold the let-off slide normally in a projected position, where it will engage and hold the protectors which have been permitted to pass the detent 11. When the depression 20 is brought into line with the rear end of let-off slide 12, the spring 19 is enabled to force the latter rearwardly thereby freeing the protectors which occupy positions on the respective raceways between the detent and the let-off.

In some cases, in order to insure that the drivers, when standing at rest in their normal positions, may not obstruct the passage of the protectors along the raceways 9, 9 from the let-off to the feet of said raceways, I mount the drivers with capacity for movement transversely into and out of driving relations with the raceways. I also provide means whereby, in the return of the drivers to their normal position after having driven a set of protectors into the work, the drivers are moved away from the sides of the raceways, while in being operated to drive a set of protectors, they are caused to approach the said raceways, again. Thus, herein, the driver-carrier 7 is shown fitted at its sides to slideways, as 21, 21, on the forwardly projecting part 6 of the plunger 5. It is acted upon by springs which tend to force it rearward in the said slideways, into the position which is represented in Figs. 2 and 4, in which the drivers are separated horizontally from the raceways. The said springs are shown at 22, Fig. 4, contained within barrels, as 23, 23, mounted upon a fixed portion of the head of the machine. Each spring is compressed between the outer closed end of the corresponding barrel and a pin, or the like, as at 24, projecting from a bolt 25 passing lengthwise through the barrel and the interior of the spring, the inner end of the said bolt bearing against a vertical plate 26 that is attached to one end of the driver-carrier 7. By the action of the said springs, the driver-carrier and drivers are caused to recede transversely from the raceways as they rise after having been depressed to force a series of protectors into the work.

In the descent of the plunger, the driver-carrier 7 is moved outwardly toward the raceways through the action of a fixed cam, as at 27, Figs. 2 and 4, the same being constituted by an inclined surface on a portion of the head of the machine. A corresponding inclined surface on the driver-carrier makes contact with the said fixed cam in the descent of the plunger, the result being that thereby the driver-carrier is forced outward until the drivers are brought closer to the raceways and into position to enter into driving relations with the foot-portions thereof in the final portion of the descent of the plungers.

As will be seen in the drawings, the drivers 8, 8, are U-shaped in horizontal cross-section, and at the time of driving the protectors they fit partially around the corresponding raceways. The feet of the raceways which are at the right and left of the series stand in planes which are oblique with reference to the middle raceway. See more particularly Fig. 10. In other words, the raceways diverge from one another at the edges thereof which are turned toward the drivers, this divergence being necessary in order that when the protectors are driven into a heel or sole they may occupy the required radiating positions adjacent to the edge thereof. The drivers are placed in corresponding oblique positions as shown in Fig. 10 in order that they may fit properly around the raceways at the time of driving.
But, on account of the divergence of the raceways toward the rear, and the corresponding oblique positions of the U-shaped drivers, it would be impossible by a simple transverse shift of the drivers from the position in which they are shown in Figs. 2, 4 and 10 to move them into the positions in which they partially inclose the raceways. The openings in the sides of the drivers are not wide enough, ordinarily, to receive the obliquely disposed raceways. Accordingly, the feet of the raceways are inclined laterally inward toward the drivers so that the said feet extend inward under the lower ends of the drivers. Hence, the transverse shift of the drivers toward the raceways, occurring during the descent of the drivers, carries the drivers into positions above the said feet, namely, into the positions which are shown in dotted lines in Fig. 10. After such shift has been effected, the drivers in their continued descent pass properly over the feet of the raceways.

28 is the part which is termed, usually the driver-block or driver-plate. It is located at the lower ends of the race-ways 9, 9. In practice it serves, as partly stated hereinbefore, as a rest or backing against which the work is placed and pressed for the purpose of having protectors driven into
the same. In one sense, therefore, it consti-
tutes a work-rest which assists in positioning the work with reference to the race-ways and drivers. At the time when the protectors are driven into the work, the latter is held clamped against the driver-block by means of the so-called work-support to which reference will presently be made. In making specific reference to the part 28 in the present description I shall ordinarily employ the terms "driver-block" or "driver-plate," but in certain of the claims, in the case of which the specific conception of a driver-block or driver-plate is not necessarily of the gist of the invention that is expressed in such claims, I have employed the term "work-rest." 29, 29, are the holes in the said driver-block or driver-plate through which the protectors are driven into the work while the latter is held pressed against the under surface of the driver-block.

30 is the work-support.

31 is the post or standard at the upper end of which the work-support is carried.

32 is the slide on which the post or standard 31 and work-support 30 are mounted.

33, 33, are the slideways in which the slide 32 is mounted to move toward and from the driver-block.

34 is the cam by means of which the slide
32 is moved toward the driver-block. The said cam is supported by a fixed portion of the machine framing 1, and is mounted to turn about a center at 35. It has connected therewith an arm 36. A spring 37 has one end thereof connected to the said arm and the other end thereof to a fixed portion of the framework 1, as shown in Fig. 2, the said spring acting to hold the cam normally in the position thereof which corresponds with the lowest position of the slide 32, and also acting to return the cam to such position, in order to lower the slide, after the cam has been operated to force the slide upwardly to compress the work between the work-support and the driver-block.

A portion of the treadle-connections by means of which the cam is operated by the attendant, as hereinbefore explained, is shown at 38, the said portion being constituted by a spring, which latter yields when the required degree of compression has been attained by the aid of cam 34. As explained hereinbefore, the preliminary portion of the movement of the treadle operates to actuate the cam to occasion the compression of the work, this being effected just before the clutch is operated to set the machine in motion.

The independent movement of the work-support 30 relatively to the slide 32, to which reference has been made, is permitted by supporting the post or standard 31 upon a plunger, as 39, which is mounted with capacity to move vertically in a suitable bearing that is provided in the upper part of the slide. The said plunger 39 may, for convenience, be designated the "lower" plunger, by way of distinguishing it from the plunger 5, which may be designated the "upper" plunger.

40 is the second cam to which reference was made at the outset herein, it being arranged to turn around a center at 41 on the slide 32, and also arranged to act against the lower plunger 39. The said cam 40 is connected operatively with the upper plunger 5 by means of the arm 42 with which the cam is provided, and the link 43 connecting the said arm with the said upper plunger. Thereby is transmitted to the cam 40 from the upper plunger 5 the movement which serves to force the work-support 30 more firmly toward the driver-block 28, and to give the final compression to the work, at the time when the drivers 8, 8, are operated to drive the protectors into the work.

The vertical adjustment of the work-support, which enables the required accommodation to be made for the thickness of the heel or sole that is to have protectors driven into the same, is obtained by means of a foot-piece 44 which is furnished with a depending screw-threaded stem fitting within a screw-threaded socket in the plunger 39. By rotating the lower plunger relatively to the foot-piece, as by means of a spanner-wrench applied to the upper end of the said plunger, the required vertical adjustment of the work-support may be secured. The foot-piece is held from turning by means of a projection 45 on a plate 46 secured to the slide 32, the said projection entering a vertical groove 47 in the rear of the body of the foot-piece. The groove enables the foot-piece to move vertically relatively to slide 32, without resulting disengagement of projection 45 from the foot-piece when independent movement is communicated to the lower plunger, and also accommodates the vertical adjustment of the foot-piece and parts supported thereby which is secured by turning the lower plunger in the manner described above.

The adjustment of the work-support in two directions transversely with relation to the driver-block or driver-plate is provided for as follows: The foot-piece 44 is formed at the top thereof with slide-ways 48, 48, extending across the same in one direction, and to the said slideways is fitted a block 49, which latter is made adjustable across the top of the foot-piece, along the said slideways, by means of an adjusting screw 50. The block 49 in turn is formed on its top with slideways 51, 51, Fig. 2, extending at right angles to the slideways 48, 48, and to the slideways 51, 51, a second block, 52, is fitted, on which latter the post or standard 31 is placed. The block 52 is adjusted along the said slideways 51, 51, by means of an adjusting screw 53. By these means, universal adjustability of the work-support in a horizontal plane is secured.

As already disclosed, the height of the plane of the work-support is capable of being varied by effecting rotary adjustment of the lower plunger 39.

The capacity of the work-support for being swung transversely, from one position to another in a horizontal plane, in order to enable the protectors to be driven properly into either a right-hand or a left-hand heel, or the like, as may be required, is provided for as follows: The post or standard 31 is provided with a central pin 54, Fig. 4, projecting down into a socket in the top of block 52. This enables the said post or standard, with the work-support 30 applied thereto, to be turned about the said central pin. The post or standard is held from rising off the block 52 by means of a strip or strips 55 secured to a raised edge 521 at the rear of the said block and extending over a horizontal flange 56 with which the base of the post or standard is provided. See, more particularly, Fig. 4. For the purpose of holding the post or standard fast in the position which has been given it by rotation around the axis of the pin 54, a screw 57 has its threaded stem fitted into a correspondingly threaded hole extending horizontally through the base of the said post or standard, either the end of said stem, or a pin 58 in line therewith, being arranged to take against the inner surface of the said edge 521 aforesaid, as in Fig. 4.

The work-support itself may in general be of any approved construction suitable to the character of the work that is required to have protectors applied to the same. My invention, however includes in particular, a form of work-support which has been devised with especial reference for use in connection with spring-heel soles. Thus, having reference more especially to Figs. 5 and 6, the work-support herein is constituted of a plate of suitable contour having pivotally mounted upon its upper surface, at the opposite sides thereof the levers 59, 59, carrying the side-guides 60, 60, and also having applied to the said surface the end-guide 61 against which the rounded back of the heel is to be caused to take bearing. The pivotal screws of the said levers 59, 59, are designated 62, 62. The side-guides 60, 60, are pivotally mounted in order to render them adjustable toward and from each other, for the purpose of enabling heels of various widths to be accommodated. For convenience in effecting the adjustment thereof, a right-and-left screw 621 is provided, its threaded portions respectively being in engagement with blocks 63, 63, which are swiveled in the rear arms of the levers 59, 59. The middle portion of the screw is plain, and is fitted to an open or slotted bearing, at 64, on the rear end of the plate constituting the body of the work-support, collars 65, 65, being provided on the screw at opposite sides of the said bearing to prevent endwise movement of the screw.

It is necessary to make compensation for the fact that the edges of the heel-portions of spring-heel-soles are cut with a bevel from the heel-seat toward the wearing surface of the same. To this end, the side-guides 60, 60, and end-guide 61 are formed each with an overhang at the top thereof, so that the flare around the edge of the heel-seat may pass in under the overhanging portions of the said guides. See also Fig. 3.

The detent 11 may consist either of a single slide coöperating with all of the raceways, or of several spring-actuated slides 11$^a$, 11$^a$, 11$^a$, arranged side by side, one for each raceway, as in Fig. 11. In the latter case, each slide is furnished with an upwardly extending pin 15, for engagement by the lever 16. The form shown in Fig. 11 is preferable to that consisting of a single slide. With the latter, should a protector on any one of the raceways occupy a position capable of preventing the detent from returning fully to its normal position adjacent the raceways, all the protectors on the other raceways would be left free to descend as soon as the let-off was retracted. With the form shown in Fig. 11, a misplaced protector on one raceway might hold back the corresponding slide, but the other slides would assume their normal position and thereby prevent the undesired descent of the protectors on the other raceways.

The retraction of the let-off, which takes place when recess 20 in the front face of the plunger 5 is presented to the rear end of the let-off 12, permits the protectors which have passed the detent and been caught by the let-off to slide down the raceways to the feet of the latter. Here they are arrested by means of spring detents 291 projecting into the holes 29 in the driver-block. See Fig. 4. When the drivers descend and force the protectors down through the said holes, the said detents yield, but return to their normal position after the subsequent rise of the drivers.

Having thus described my invention and the manner in which the same may be reduced to practice, what I claim is:—

1. In combination, a work-rest, protector-feeding devices, drivers, and a plurality of raceways having the delivery-portions thereof located at the driving-points with the said delivery-portions occupying different angular positions and engaging with the protectors to cause the latter to occupy correspondingly varied angular positions in the work.

2. In combination, the plurality of fixed raceways extending to the place in the machine at which the protectors are driven, a work-rest immediately adjacent the delivery ends of the said raceways, devices for controlling the passage of the protectors along the raceways and allowing them to pass successively to the place where they are driven, the drivers operating to drive the protectors from directly at the delivery ends of the said fixed raceways into the work which is held presented against the said work-rest to receive them, the carrier for the drivers, and means to operate the said carrier and also to cause the drivers to recede transversely from the raceways when elevated.

3. In combination, the plurality of fixed raceways extending to the place in the machine at which the protectors are driven, a work-rest immediately adjacent the delivery ends of the said raceways, the drivers operating to drive the protectors from immediately at the delivery ends of the said fixed raceways into the work which is held presented against the said work-rest to receive them, the driver-carrier, the plunger, and the cam and spring or springs acting to move the driver-carrier transversely with relation to the fixed raceways as the plunger rises and falls.

4. In combination, the fixed raceways extending to the place in the machine at which the protectors are driven, a work-rest immediately adjacent the delivery ends of the said raceways, the U-shaped drivers operating to inclose the said fixed raceways and drive the protectors immediately at the delivery ends of the said fixed raceways into the work which is held presented against the said work-rest to receive them, and means to operate the said drivers.

5. In combination, a work-rest, drivers, and a plurality of raceways having inclined delivery-ends extending into the paths of the drivers with the said delivery-portions occupying different angular positions and engaging with the protectors to cause the latter to assume correspondingly varied angular positions in the work.

6. In combination, the fixed raceways extending to the place in the machine at which the protectors are driven, a work-rest immediately adjacent the delivery ends of the said raceways, the U-shaped drivers operating to inclose the said fixed raceways and drive the protectors immediately at the delivery ends of the said fixed raceways into the work which is held presented against the said work-rest to receive them, and means to operate the said drivers, the said fixed raceways having the delivery ends thereof inclined with relation to the drivers.

7 In combination, the fixed raceways extending to the place in the machine at which the protectors are driven, a work-rest immediately adjacent the delivery ends of the said raceways, the U-shaped drivers operating to inclose the said fixed raceways and drive the protectors immediately at the delivery ends of the said fixed raceways into the work which is held presented against the said work-rest to receive them, and means to operate the said drivers and to withdraw them from the raceways into a horizontally removed position when raised.

8. In combination, the fixed raceways extending to the place in the machine at which the protectors are driven, a work-rest immediately adjacent the delivery ends of the said raceways, the U-shaped drivers operating to inclose the said fixed raceways and drive the protectors immediately at the delivery ends of the said fixed raceways into the work which is held presented against the said work-rest to receive them, and means to operate the said drivers and to withdraw them from the raceways into a horizontally removed position when raised, the said fixed raceways having the delivery ends thereof inclined with relation to the drivers.

9. In combination, the fixed raceways extending to the place in the machine at which the protectors are driven, a work-rest immediately adjacent the delivery ends of the said raceways, the U-shaped drivers operating to inclose the said fixed raceways and drive the protectors immediately at the delivery ends of the said fixed raceways into the work which is held presented against the said work-rest to receive them, the driver-carrier, the plunger, and the cam and spring or springs coacting in occasioning transverse movement of the driver-carrier and drivers as the plunger rises and falls, the said fixed raceways having the delivery ends thereof inclined with relation to the drivers.

10. In a machine for driving protectors, in combination, a work-rest, a driver, devices for feeding protectors successively, and a raceway constituting a guide by which the angular position of a protector in being driven is controlled with the terminal portion thereof in a fixed position at the driving point.

11. In a machine for driving protectors into the heels or soles of boots and shoes, in combination, a fixed raceway extending to the place in the machine at which the protectors are driven, a work-rest immediately adjacent the delivery end of the said raceway, devices for controlling the passage of the protectors along the raceway and allowing them to pass successively to the place where they are driven, the driver operating to drive the protectors from directly at the delivery end of the said fixed raceway into the work which is held presented against the said work-rest to receive them, the carrier for the driver, and means to operate the said carrier and also to cause the driver to recede transversely from the raceway when elevated.

12. In combination, a fixed raceway extending to the place in the machine at which the protectors are driven, a work-rest immediately adjacent the delivery end of the said raceway, devices for controlling the passage of the protectors along the raceway and allowing them to pass successively to the place where they are driven, the driver operating to drive the protectors from directly at the delivery end of the said fixed raceway into the work which is held presented against the said work-rest to receive them, the driver-carrier, the plunger, and the cam and spring or springs acting to move the driver-carrier transversely with relation to the fixed raceways as the plunger rises and falls.

13. In a machine for driving protectors into the heels or soles of boots and shoes, in combination, a raceway extending to the place in the machine at which the protectors are driven, a work-rest immediately adjacent the delivery end of the said raceway, the U-shaped driver operating to inclose the said raceway and drive the protectors from the delivery end of the said raceway into the work which is held presented against the said work-rest to receive them, and means to operate the said driver.

14. In a machine for driving protectors into the heels or soles of boots and shoes, in combination, a fixed raceway constituted of a ribbon or strip adapted to receive protectors astride the same and extending to the place in the machine at which the protectors are driven, a work-rest immediately adjacent the delivery end of the said fixed raceway, the driver operating to drive the protectors from immediately at the delivery end of the said fixed raceway into the work which is held presented against the said work-rest to receive them, and means to operate the said driver, the said fixed raceway having the delivery end thereof inclined into the path of the driver.

15. In a machine for driving protectors into the heels or soles of boots and shoes, in combination, a fixed raceway extending to the place in the machine at which the protectors are driven, a work-rest immediately adjacent the delivery end of the said raceway, the U-shaped driver operating to inclose the said fixed raceway and drive the protectors immediately at the delivery end of the said fixed raceway into the work which is held presented against the said work-rest to receive them, and means to operate the said driver, the said fixed raceway having the delivery end thereof inclined with relation to the driver.

16. In a machine for driving protectors into the heels or soles of boots and shoes, in combination, a raceway extending to the place in the machine at which the protectors are driven, a work-rest immediately adjacent the delivery end of the said raceway, the U-shaped driver operating to inclose the said raceway and drive the protectors from the delivery end of the said raceway into the work which is held presented against the said work-rest to receive them, and means to operate the said driver and to withdraw it from the raceways into a horizontally removed position when raised.

17. In a machine for driving protectors into the heels or soles of boots and shoes, in combination, the raceway extending to the place in the machine at which the protectors are driven, a work-rest immediately adjacent the delivery end of the said raceway, the U-shaped driver operating to inclose the said raceway and drive the protectors from the delivery end of the said raceway into the work which is held presented against the work-rest to receive them, and means to operate the said driver and to withdraw the same from the raceway into a horizontally removed position when raised, the said raceway having the delivery end thereof inclined with relation to the driver.

18. In a machine for driving protectors into the heels or soles of boots and shoes, in combination, the raceway extending to the place in the machine at which the protectors are driven, a work-rest immediately adjacent the delivery end of the said raceway, the U-shaped driver operating to inclose the said raceway and drive the protectors from the delivery end of the said raceway into the work which is held presented against the said work-rest to receive them, the driver-carrier, the plunger, and the cam and spring or springs coacting in occasioning transverse movement of the driver-carrier and driver as the plunger rises and falls, the said raceway having the delivery end thereof inclined with relation to the driver.

19. In a machine for setting heel and sole protectors, in combination, a raceway constituted of a rib or strip adapted to receive protectors astride the same and extending to the place in the machine at which the protectors are driven, means for feeding protectors singly along the said raceway, a fixed driver-block having a protector-passage at which the raceway terminates, a yielding detent for holding a protector at said passage until it is driven, and a driver acting to drive the protector from directly at the delivery end of the said raceway into the work.

20. In combination, the driver-block, a driver to set a protector in the work which is held against the driver-block, actuating means for the said driver, a work-support, a movable carrier for the work-support, manually-operated means for moving the said carrier to compress the work between the work-support and the driver-block, and mechanism operatively controlled by the driver-actuating means to move the work-support on the said carrier and thereby further compress the work against the driver-block at the time of the driving.

21. In combination, the driver-block, a driver to set a protector in work held against the said driver-block, means to actuate the said driver, the work-support, a manual starting device, a cam operatively connected with the said manually-operated starting device and acting upon the said carrier to move the work-support toward the driver-block and compress the work against the latter, and a second cam mounted upon the said carrier and operatively controlled by the driver actuating means to move the work-support upon the carrier and thereby further compress the work-support against the driver-block at the time of the driving.

22. In combination, the driver-block, a driver to set a protector in work held against the driver-block, actuating means for the said driver, the work-support, a slide on which the same is mounted with capacity for independent movement toward and from the driver-block, a manually-operable cam acting on the said slide to move the same and the work-support toward the driver-block, and a second cam mounted on said slide, and operatively controlled by the driver-actuating connections to move the work-support upon the slide and thereby effect a final compression of the work at the time of the driving.

23. In combination, the driver-block, a driver to set a protector in work which is held against the driver-block, the plunger carrying said driver, actuating means for said plunger, a work-support, a slide movable toward and from the driver-block and carrying the work-support, a manually-operable cam acting upon the slide to carry the latter and the work-support toward the driver-block, a second cam adapted to occasion independent movement of the work-support upon the slide, and operative connections between the plunger and said second cam to actuate the latter and thereby further compress the work against the driver-block at the time of driving.

24. In combination, the driver-block, a driver, actuating means for the said driver, a work-support, a foot-piece connected with the work-support, a plunger on which the foot-piece is mounted with capacity for vertical adjustment, a slide on which said plunger is mounted with capacity for vertical movement, a cam acting on said plunger to occasion such movement and operatively controlled by the driver-actuating means, and a manually-operable cam to move said slide toward the work-support.

25. In combination, the driver-block, a driver, driver-actuating means, the work-support, a plunger carrying the same, devices for effecting universal adjustment of the said work-support in a horizontal plane upon said plunger, a slide on which said plunger is mounted, manually-operable means to move the slide toward the driver-block, and a cam mounted upon the said slide, operatively connected with the driver-actuating means and operating to move the plunger and work-support upon the slide toward the driver-block.

26. In combination, the driver, actuating means therefor, the driver-block, the slide, the cam acting against said slide to move it toward the driver-block, the plunger carried by the said slide, means to move the plunger on the slide toward the driver-block at the time of the driving, the foot-piece in screw-threaded engagement with the said plunger and thereby adjustable thereon toward and from the driver-block, the block mounted on said plunger and provided with means for adjusting it horizontally in one direction thereon, and the work-support provided with means of supporting it on the said block and adjusting it horizontally thereon in a direction at right angles to the first.

27. In a machine for inserting heel or sole protectors, a work rest having a driver passage and a driver, said driver being movable laterally into and out of alinement with said driver passage and being movable longitudinally to drive a protector through said driver passage.

28. In a machine for inserting heel or sole protectors, having laterally extending wings, a work rest having a driver passage, a raceway extending into said driver passage, and a driver shaped to allow it to pass said raceway.

29. In a machine for inserting heel or sole protectors having laterally extending wings, a work rest having a driver passage, a raceway extending into said driver passage, a driver shaped to allow it to pass said raceway, said driver being movable laterally into and out of alinement with said driver passage and being movable longitudinally to drive a protector from said raceway and out of said driver passage.

30. In a machine for inserting bent strip-like heel or sole protectors, in combination, a driver, and a raceway having the terminal portion thereof fixedly located at the driving-point in the machine, said raceway constructed for engagement with a protector to present the latter edgewise to the work and control the angular position of the protector at the said point in being driven.

31. In a machine for inserting heel or sole protectors, in combination, a raceway whereby bent strip-like protectors are conducted to the driving point in the machine, constructed to engage between opposite portions of a protector and thereby control the position of the protector in being driven, and a driver to drive a protector from the delivery end of the said raceway into the work.

32. In combination, a driver, a work-rest, a work-holder, a manually-operated device to move the work-holder to compress the work against the work-rest, and mechanism acting automatically to operate the work-holder for the compression of the work at the time of driving.

33. In combination, a driver, a work-rest, a work-holder, a carrier for the work-holder, a manually-operated device to move the said carrier to carry the work-holder toward the work-rest to compress the work against the latter, and mechanism acting automatically to move the work-holder relative to the carrier for a final compression of the work at the time of driving.

34. In combination, a driver, a work-rest, a work-holder, a manual starting device, means connected with said starting device to move the work-holder to compress the work against the work-rest, and operative connections with the driver whereby the work-holder is actuated automatically to occasion a final compression of the work at the time of driving.

35. In a machine for inserting heel or sole protectors having laterally extending wings, a work-rest having a driver-passage, a raceway extending to said driver-passage and constituting an interior support for the protectors, and a driver shaped to embrace the said raceway.

36. In a setting machine for bent strip-like heel or sole protectors, in combination, a raceway constituting an inside guide for protectors at the driving-point having its delivery-portion fixed in position at the said point, a driver, a reciprocating driver-carrier, and feeding-devices operated by the said driver-carrier in the movements of the latter.

37. In a protector-setting machine, in combination, a raceway shaped to receive and fit the protectors to be driven and to guide and control the angular position of the same in being driven having its delivery-portion in fixed position at the driving-point, an escapement controlling the passage of the protectors along the said raceway, and a driver.

In testimony whereof I affix my signature, in presence of two witnesses.

HENRY W. WINTER.

Witnesses:
 Chas. F. Randall,
 Lepine Hall Rice.